(12) United States Patent
Smith

(10) Patent No.: US 7,376,757 B2
(45) Date of Patent: May 20, 2008

(54) DRIVERLESS INTERFACING OF A REMOVABLE DEVICE WITH A DIGITAL PRODUCT

(75) Inventor: Anthony David King Smith, Abinger Common (GB)

(73) Assignee: Matsushita Electric Industrial Co., Ltd., Osaka (JP)

( * ) Notice: Subject to any disclaimer, the term of this patent is extended or adjusted under 35 U.S.C. 154(b) by 325 days.

(21) Appl. No.: 10/813,616

(22) Filed: Mar. 31, 2004

(65) Prior Publication Data
US 2004/0268041 A1 Dec. 30, 2004

(30) Foreign Application Priority Data
Mar. 31, 2003 (GB) ................................ 0307450.7

(51) Int. Cl.
G06F 3/00 (2006.01)
G06F 9/455 (2006.01)
G06F 7/00 (2006.01)
G06F 12/00 (2006.01)

(52) U.S. Cl. ............ 710/5; 710/6; 710/7; 710/62; 703/23; 703/24; 707/1; 707/200

(58) Field of Classification Search ............ 710/5, 710/6, 7, 62; 703/23, 24; 707/1, 200
See application file for complete search history.

(56) References Cited

U.S. PATENT DOCUMENTS

| | | | | |
|---|---|---|---|---|
| 5,463,772 A | * | 10/1995 | Thompson et al. | 707/101 |
| 6,078,968 A | * | 6/2000 | Lo et al. | 710/5 |
| 6,234,389 B1 | * | 5/2001 | Valliani et al. | 235/380 |
| 6,823,398 B1 | * | 11/2004 | Lee et al. | 710/5 |
| 6,871,245 B2 | * | 3/2005 | Bradley | 710/65 |
| 6,886,083 B2 | * | 4/2005 | Murakami | 711/156 |
| 2003/0085289 A1 | * | 5/2003 | Kaneko | 235/492 |
| 2004/0225796 A1 | * | 11/2004 | Hanson et al. | 710/301 |

FOREIGN PATENT DOCUMENTS

| | | |
|---|---|---|
| EP | 1 104 976 A1 | 6/2001 |
| EP | 1 191 451 A2 | 3/2002 |
| WO | WO 98/21639 | 5/1998 |

OTHER PUBLICATIONS

British Search report issued in corresponding U.K. Patent Application No. GB 0307450.7 dated Nov. 4, 2003.
Deitz, C., CFFM pocketRADIO at "FM Radio on your Handheld PDA", Jan. 27, 2003, URL: http://radio.about.com/library/weekly/aa012703a.htm.

* cited by examiner

*Primary Examiner*—Kim Huynh
(74) *Attorney, Agent, or Firm*—McDermott Will & Emery LLP

(57) ABSTRACT

In order to avoid the need for upgrade software when enhancing the function of a digital product, e.g. PDA, and SD lookalike card or other removable device provided with an active function such as digital radio is able to create the appearance of a file structure relating to the radio functions so that the PDA can communicate with it in file system language.

17 Claims, 1 Drawing Sheet

DRIVERLESS INTERFACING OF A REMOVABLE DEVICE WITH A DIGITAL PRODUCT

Figure 1:
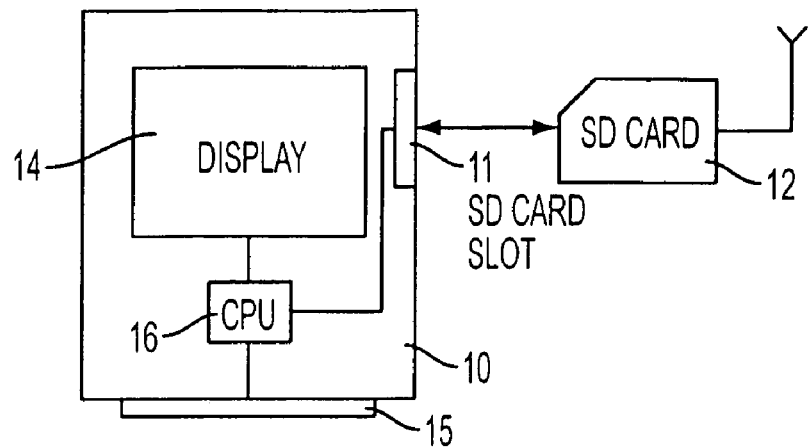

The present invention relates to a method for interfacing devices and more particularly to a method which is suitable for use with portable devices.

The invention also relates to a slot in accessory for use with digital products, especially portable devices such as PDAS.

Many portable devices are now being manufactured with external memory slots to allow users to upgrade their devices with additional memory and/or software after purchase. The SD card is an excellent example of this technology, and slots capable of accepting SD cards are now found on many items of equipment including PDAs, mobile phones, audio players, digital cameras, camcorders and other consumer electronics products whether mobile or not. Other formats such as MMC, CompactFlash and SmartMedia are similar in their capabilities.

The use of an SD card has recently been expanded beyond its original use in order to provide I/O functions such as adding Bluetooth to PDAS.

While the use of external memory cards for input/output functions is generally advantageous, up to now it has required the user to upgrade the software in the device in order to provide a driver program associated with the CPU of the main device. This usually requires the main device to be connected to a computer so that the software associated with the main device can be modified to include the appropriate driver.

Another example of prior art is the iBIZ pocketRADIO available from iBIZ Technology Corporation which simply plugs into the SD card slot of a PDA (personal Digital Assistant). Before the radio can be used the PDA has to be upgraded using a CD containing installation software provided with the radio.

It is an object of present invention to provide a method which will permit I/O subsystems to be utilized which require no special low-level drivers to be written in order to access the full functionality.

In one aspect, the present invention provides a method for interfacing a removable memory device with a main device such that a program contained on the removable memory device will have its functions mapped into a series of simple file system calls that are already provided with the main device.

The advantages of this arrangement is that applications can be written and stored on a removable memory device that are very easily ported from one platform to another even if different operating systems are used since the applications only regard the removable memory device as a file system.

Specifically, in a first aspect, the invention provides a method for interfacing a removable storage device with a digital product, comprising providing the product with a digital processor and a file command structure, providing a removable storage device with circuitry for carrying out a predetermined function, the circuitry including a further processor, using the further processor to create a plurality of files each relating to a sub-function of the predetermined function, creating a table of the plurality of files, receiving file commands from the digital processor and using the table of files to translate a file command into a sub-function whereby to control the predetermined function.

In fact is not necessary for actual files to be created, provided that the removable device communicates in file system commands. Likewise the removable device need not necessarily store data, it may function only as an add-on processor.

The predetermined function may be a digital radio, for example. For each sub function of the radio, e.g. "receive a selected station" or "increase or decrease volume" the further processor on the storage device creates a pseudo file. Thus, the radio appears to the digital product as if it was simply a storage device containing files.

The "predetermined function" can be anything other than simple file storage which is what would normally be expected of a removable storage device.

In another aspect the invention provides a slot in accessory for a digital product which enhances the functioning of the digital product whilst appearing to the digital product as if it was a removable storage device.

Thus, in another aspect, the present invention provides a slot-in accessory for a digital product having a digital processor with a file command structure, a slot for receiving a removable memory device and an interface for a removable memory device whereby to access files stored on the memory device, the slot-in accessory being insertable into the memory device slot and having an interface for communicating with the digital product using normal file system commands and functions. Thus far, the invention resembles a known removable memory device.

The accessory of the invention has an active function. The expression "active function" is intended to encompass functions other than passive file storage and supply of data, such as reception of radio signals, television reception, audio or video playback and so on.

In order to avoid the need to provide the digital product with upgrade software for implementing this active function the accessory is able to translate file system type commands received from the digital product into function commands, and conversely translate function responses received from the active function into file system responses for sending to the digital product.

The operations of the active function may be presented to the digital product (and hence the user) as a series of apparent files. Then an operation of the digital product on the active file (e.g. "open") can result in an operation of the active function (e.g. play Radio 1) being carried out.

The accessory may have the same external appearance as the removable storage device. Alternatively it may have a portion insertable into the slot to which other hardware is attached, depending on the exact nature of the active function.

The file system commands will usually include, amongst others, "read", "write", "copy", "move", "delete" etc. and will be mapped to commands for the active function.

In further the accessory might be incorporated in a digital product as an active function module, as described in claims 16 and 17.

Figure 2:
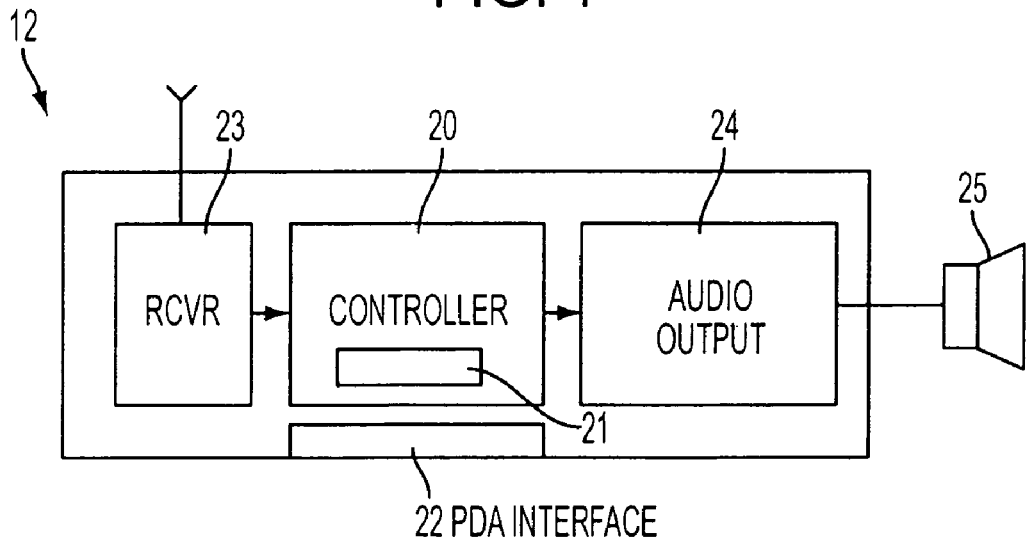
Figure 3A:
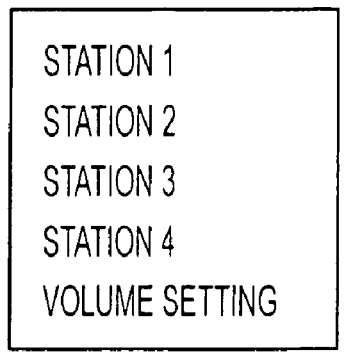
Figure 3B:
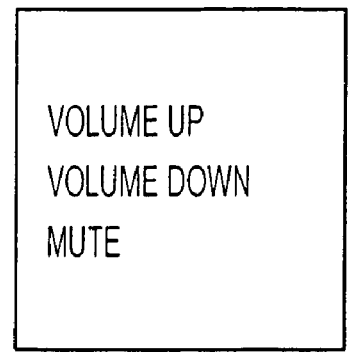

In order that the present invention be more readily understood, an embodiment thereof will now be described by way of example with reference to the accompanying drawing in which:

FIG. 1 shows a diagrammatic representation of a digital device fitted with a removable memory receiver according to the present invention, FIG. 2 shows schematically the receiver functions included in the removable receiver, and FIG. 3 shows two possible screen displays that might appear during the operation of the receiver.

The preferred embodiment of the present invention will be described in relation to the use of a modified SD card to provide a broadcast radio receiver facility for a portable device such as a mobile phone or PDA. This is a typical example and it will be appreciated that the invention is of broader scope than this and will allow a number of different facilities to be provided.

Referring now to the drawing, it is assumed that the basic apparatus is, for example, a PDA 10 which is already provided with an SD card slot 11 for receiving an SD memory card. It is also assumed that the PDA will have a display 14 and also an input/output facility 15.

Since an SD card slot 11 is already provided, a CPU 16 of the PDA already has a file handling facility for interfacing with the SD card slot 11 in view of the fact that conventional SD cards simply contain files. The CPU is thus able to open and close files as well as read from and write to files in an SD card loaded into the card slot.

If we now assume that a modified SD card 12 is loaded into the card slot 11 and the modified card contains I/O functions, the present embodiment proposes to map all these functions into a series of simple file system calls as identified above.

In the present example where a digital radio is implemented on an SD card, the SD card can include a radio receiver 23 and a controller 20 that translates file system calls from PDA 10 into commands for the hardware. For this purpose the controller 20 has means 21 creating a pseudo file structure (or actual file structure) mapping the hardware functions onto pseudo files. This communicates with PDA interface 22. Thus, when a user wishes to utilize a broadcast radio receiver facility on a PDA, the appropriate SD card is loaded into the card slot in the PDA which results in the PDA recognizing that a card is present and downloading what appears to be a file relating to the type of card. This causes a radio icon to appear on the display of the PDA. When the user selects the radio icon, this results in the CPU 16 sending a file call (e.g. open ("radio")) to the SD card. The controller on the SD card translates this (e.g. open ("radio")) call as an instruction to switch on the radio receiver. The card is now connected to the PDA power source and this causes the radio receiver on the card to find all stations it can receive and create files containing the names of all such stations. Once the radio has been successfully "opened" various top level information can be obtained such as number of services, signal strength etc by using read() commands associated with the now opened "radio" pseudo file (i.e. not a real file, but something that locks like a file to the PDA). In the case of changing stations, the CPU 16 sends an (open "stations") file call to the PDA which results in the files relating to the station names to be displayed as if this were a directory of files, as shown in FIG. 3*a*. When the user selects a desired station, this generates a (read "station 2") file call which is translated by the controller on the SD card as an instruction to tune the receiver to the station frequency representing station 2. In the case of changing the volume, when the user wishes to alter the volume it is necessary for the CPU 16 to send a (read "volume") file call to the SD card controller and then if the user wishes to increase the volume the CPU 16 will send a (read "volume") call to the SD card controller 20 which will be interpreted by the controller 20 as a request to increase the volume.

If this is arranged to be done in a stepwise fashion, it may be necessary to send more than one (read "volume") file call. Conversely, if the user wishes to reduce the volume, the CPU of the PDA will send a (write "volume") file call to the modified SD card which will be interpreted by the SD card controller as a reduce volume instruction. Again, this can be done in a stepwise fashion by repeated file calls.

Alternatively as shown in FIG. 3(*b*) it is possible to create separate "volume up" and "volume down" files to increment the volume to achieve a desired level.

The files or pseudo files can be arranged in directories in a hierarchical structure as with any typical file system, whereby to operate functions and sub-functions. As a simple example, "volume up", "volume down" and mute" could be sub files of a "volume control" file.

It may be necessary to provide some audio output for the PDA if this is not already built in, and a speaker or speakers can be connected to the normal I/O output connection provided on PDAs. Alternatively the accessory may have audio output 24 and a speaker 25. In the case of a mobile phone, if already is provided with a speaker and so all that is required is for the CPU in the phone to forward to coded audio signals from the SD card to decoding and audio output circuitry of the phone.

The PDA would typically have already installed on it suitable music playback capability such as "Windows Media" (TM). Thus, Windows Media could be asked to "play" the contents of the modified SD card 12 just as if contained stored audio files. The PDA would see no difference between e.g. DAB radio format and stored finite files.

If one assumes that the software on the modified SD card is written in "C", the only modifications required to make the modified SD card work on a completely different PDA that also supported as SD card interface would be to change the calls to those used by the new platform's standard operating system calls to the SD card when accessing it as a normal memory card.

Preferably though, the software on the SD card should not have to change for a different host because SD cards are designed to work unmodified in a wide range of hosts, by using an industry standard filing system which will be recognized by many operating systems.

The advantage of this arrangement is that it removes a key problem for manufacturers producing new peripheral equipment since any software written to support the peripheral is very easily ported, thus increasing the ability of manufacturers to support a far wider range of end user platforms e.g. different PDAs such as Pocket PC™ or Palm OS™.

Depending on the function of the accessory according to the invention, it may be incorporated entirely in an item which appears to be an SD card or other storage device.

Alternatively the accessory may simply have a portion which fits into the SD card slot and added hardware which then extends from the PDA after insertion.

A simple accessory according to this invention ported to a PDA or other digital product via the SD card slot may not need any software application in order to operate because the PDA would usually be already equipped with an application such as a file system explorer capable of operating the functionality of the accessory, such as the SD card radio described above. In this example it would not be necessary for the modified SD card or other plug in accessory to store any data.

If, on the other hand, some specific application software was needed to operate the active function, of the type ordinarily supplied separately on a CD Rom, this would not be necessary since the application can be stored on the slot-in accessory and would be readily accessible by the PDA because of its file system structure.

Writing application software for a plug-in accessory would be very simple since there would be no need to write different versions for different devise. Most devices are equipped to access files and would therefore be able to access applications in this format.

The invention can be used to overcome any problems associated with the introduction of new data formats, since the software necessary to enable the digital product to read the new format could be part of the removable accessory.

With an accessory according to the invention, a digital product such as a PDA could be equipped to handle any form of streamed multimedia content such as video, slide shows etc, as well as packet data such as program guides. Thus, the PDA could display data that was regularly updated whilst allowing the users to navigate through it as if it was a set of static files.

The invention claimed is:

1. A slot-in accessory for a digital product having a digital processor with a file command structure, a slot for receiving a removable memory device and an interface for a removable storage device whereby to access files stored on the storage device, at least a portion of the slot-in accessory being insertable into the storage device slot and having an interface for communicating with the digital product using file system calls and responses, wherein:

the accessory has an active function other than storage operable in response to function commands and means for translating file system calls received from the digital product into commands recognizable by the active function, and responses from the active function into file system response to be sent to the digital product, and the operations of the active function are presented to the digital product as a series of apparent files.

2. An accessory as claimed in claim 1 in which an operation by the digital product on an apparent file results in an operation of the active function being carried out.

3. An accessory as claimed in claim 2 whose active function is that of a digital radio receiver.

4. An accessory as claimed in claim 3 which the identities of stations received by the receiver are presented as a series of files to be read by the digital product.

5. An accessory as claimed in claim 3 in which as commands "volume up" and "volume down" as presented to the digital product as available files.

6. An accessory as claimed in claim 3 which the data storage stores software usable by the digital product to enable the digital product to operate the active function.

7. An accessory as claimed in claim 1 in which the apparent files are presented in a hierarchical structure with at least some apparent files having one or more levels of apparent sub-files.

8. An accessory as claimed in claim 1 in which the accessory includes data storage.

9. A method for interfacing a removable storage device with a digital product, comprising providing the product with a digital processor and a file command structure, providing a removable storage device with circuitry for carrying out a predetermined function other than storage, the circuitry including a further processor, using the further processor to create a plurality of apparent files each relating to a sub-function of the predetermined function, creating a table of the plurality of apparent files, receiving file commands from the digital processor and using the table of apparent files to translate a file command into a sub-function whereby to control the predetermined function.

10. A method according to claim 9, wherein the file command structure includes the commands open, close, read and write.

11. A method according to claim 9 or 10, wherein the files created in the removable storage device relate to a digital radio receiver.

12. A method according to claim 11, wherein the file includes files relating to the transmission frequencies of stations received by the receiver.

13. A method according to claim 11, wherein the files include files relating to the volume of the received signal.

14. A removable storage device for use with a main apparatus comprising a processor and circuitry for performing a specified function other than storage, means for generating apparent files relating to the specified function, means for receiving file calls from the main apparatus, translation means for translating file calls into sub-functions commands of the specified function using the generated apparent files, and means for inputting the sub-function command to the processor.

15. A device according to claim 14, wherein the specified function is a digital radio receiver.

16. A device according to claim 14 or 15, wherein the device is configured as an SD card.

17. A digital product having a digital processor with a file command structure, an active function module and an interface enabling the digital processor to communicate with the active function module using file system calls and responses, wherein the interface between the digital processor and the active function module includes means for translating file system calls received from the active product into commands recognizable by the active function module for other than storage and responses from the active function module into file system responses to be sent to the digital product, and wherein the functions other than storage of the active function module are presented to the digital processor as a series of apparent files in a hierarchical structure with at least some apparent files having one or more levels of apparent sub-files.

* * * * *